United States Patent [19]

Calad et al.

[11] Patent Number: 4,936,491
[45] Date of Patent: Jun. 26, 1990

[54] RETRACTABLE VEHICLE GARMENT HANGER

[76] Inventors: Ruby R. Calad, 16311 Elmwood Point La., Sugar Land, Tex. 77478; Carl O. Gellenthin, Jr., 2108 Chimney Rock, Houston, Tex. 77056

[21] Appl. No.: 425,260

[22] Filed: Oct. 23, 1989

[51] Int. Cl.[5] ............................................. B60R 11/00
[52] U.S. Cl. ..................... 224/42.46 A; 224/42.45 A
[58] Field of Search ............... 224/311, 313, 42.45 A, 224/42.46 R, 42.45 R, 42.46 A, 282, 314; 294/141, 142; 223/94

[56] References Cited
U.S. PATENT DOCUMENTS 3,386,589 6/1968 Prete, Jr. ............................... 223/94
4,444,344 4/1984 Marcus et al. ....................... 224/313

Primary Examiner—Henry J. Recla
Assistant Examiner—David J. Walczak
Attorney, Agent, or Firm—Fulbright & Jaworski

[57] ABSTRACT

A retractable garment hanger for attachment to the inside of a vehicle which includes a hanger body having arms for holding clothes and a support connected to the body for supporting the body from the inside of a vehicle. The support includes a hinge for moving the body between a down position for hanging clothes and an up position for storing the body. The support includes a releasable fastener for releasably holding the hanger body in an up position. The hanger may be used with a vehicle having a recess in the roof for receiving the hanger body when it is in the up position.

6 Claims, 1 Drawing Sheet

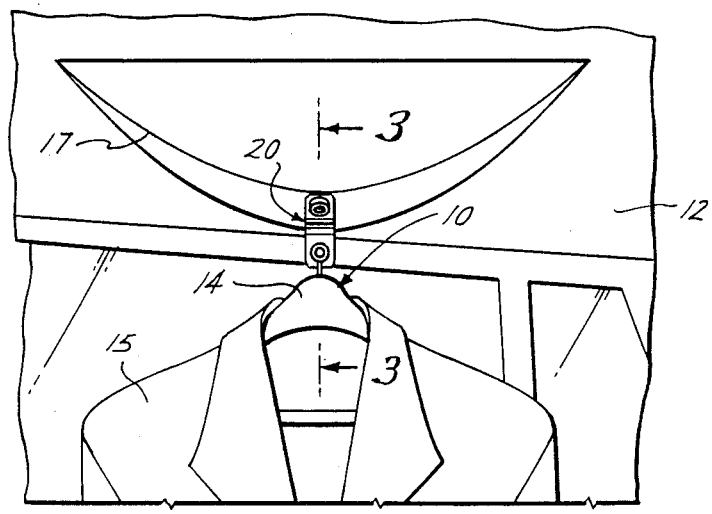
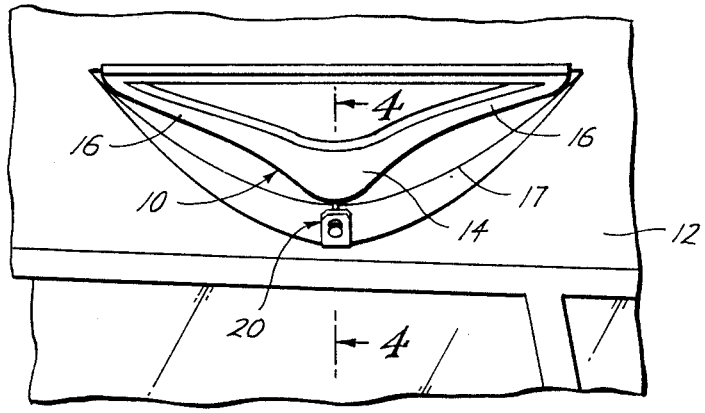
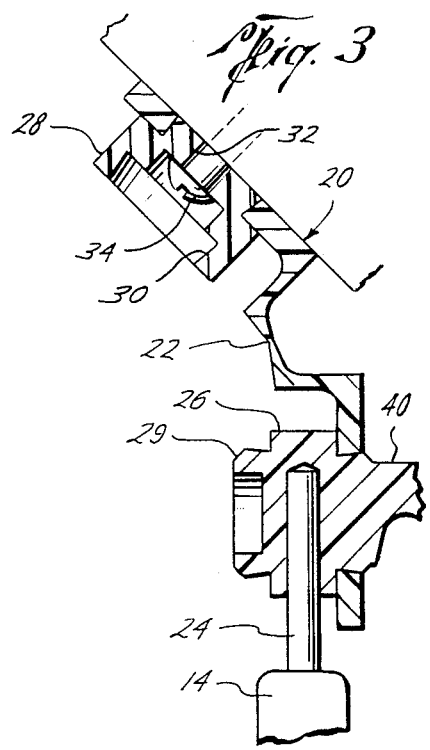
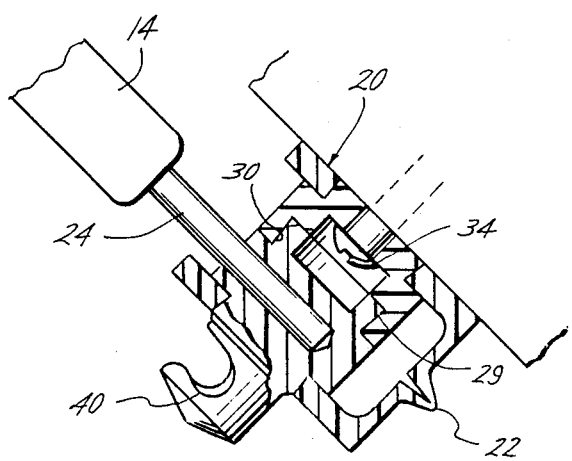

RETRACTABLE VEHICLE GARMENT HANGER

Automobiles are generally equipped with a garment hook fastened to the inside of the car, normally over the back windows. The garment hook is adapted to receive and carry a garment hanger so that the occupant of the automobile may conveniently hang a jacket or other piece of clothing in order to keep it neat and clean. However, this requires providing a garment hanger which may not be readily available at the time. Furthermore, a conventional garment hanger when not in use supporting a garment creates an annoying and rattling noise and is generally in the way.

The present invention is directed to a retractable vehicle garment hanger which can be used to replace the conventional automotive garment hook and can hang in a down position supporting a garment when desired, but can be easily stored away in an up position against the inside of the car when not in use.

SUMMARY

The present invention is directed to a retractable garment hanger for attachment to the inside of a vehicle and includes a hanger body having arms for holding clothes. A support is connected to the body for supporting the body from the inside of a vehicle. The support includes a hinge for moving the body to a down position for hanging clothes and to an up position for storing the body. The support includes releasable fastening means for releasably holding the hanger body in an up position.

A still further object of the present invention is the provision of a swivel connection between the hanger body and the support for allowing rotational movement of the hanger relative to the vehicle for easily placing on and removing clothes from the hanger.

A still further object is wherein the releasable fastening means includes coacting snap locking means on opposite sides of the hinge. In a preferred embodiment the coacting locking means includes lower and upper buttons, the lower button including a projection and the upper button including a recess for releasably securing the projection. Preferably the lower and upper buttons are rotatably secured to the support for easily positioning the hanger.

A still further object of the present invention is wherein the recess extends through the upper button for receiving a fastener for attaching the hanger to the inside of the vehicle.

A still further object of the present invention is wherein the vehicle includes a recess in the inside of the roof for receiving the hanger body when it is in the up position.

Another object is the provision of a hook on the support which is positioned projecting outwardly when the support is in the up position for receiving a conventional clothes hanger.

Other and further objects, features and advantages will be apparent from the following description of a presently preferred embodiment of the invention, given for the purpose of disclosure, and taken in conjunction with the accompanying drawings, where like character references designate like parts throughout the several views.

BRIEF DESCRIPTION OF THE DRAWINGS

FIG. 1 is an elevational, fragmentary view showing the present invention in position in a vehicle in a down position supporting a garment, FIG. 2 is a view similar to FIG. 1 showing the present invention in the up or retracted position, FIG. 3 is an enlarged cross-sectional view taken along the line 3—3 of FIG. 1, and FIG. 4 is an enlarged cross-sectional view taken along the line 4—4 of FIG. 2.

DESCRIPTION OF THE PREFERRED EMBODIMENT

Referring now to the drawings, and particularly to FIGS. 1 and 2, the reference numeral 10 generally indicates the retractable garment hanger of the present invention for attachment to the inside 12 of a vehicle. The purpose of the retractable garment hanger 10 is to replace the conventional hook which is normally provided on the inside of vehicles for receiving a conventional garment hanger. The present garment hanger 10 generally replaces the conventional hook which is fastened on the inside 12 of the car, normally over the back windows.

The retractable garment hanger 10 of the present invention generally includes a hanger body 14 having arms 16 for holding clothes, and a support generally indicated by the reference numeral 20 for supporting the body 14 from the inside 12 of a vehicle.

Referring now to FIGS. 3 and 4, the support 20 includes a hinge 22 for moving the hanger body 14 to a down position, as best seen in FIG. 1, for hanging clothes, such as a coat 15, and to an up position, as best seen in FIG. 2, for storing the hanger body 14 against the inside of the vehicle, preferably, the roof, and preferably in a recess 17 in the roof of the vehicle 12.

The hanger body 14 may be connected and supported from the support 20 by a rod 24. Preferably, the hanger body 14 is rotatably connected to the rod 24 allowing for rotational movement of the hanger body 14 relative to the vehicle for ease of inserting and removing clothes from the hanger body 14.

The releasable fastening means of the support 20, for releasably holding the garment hanger 10 in the up position of FIG. 2, includes coacting snap locking means on opposite sides of the hinge 22. Preferably, the coacting locking means includes a lower button 26 and an upper button 28 in which the lower button 26 includes a projection 29 and the upper button 28 includes a recess 30 for releasably receiving and securing the projection 29 therein. Preferably, the buttons 26 and 28 are rotatably secured in the support 20 for adjusting the position of the support 20 and thus of the hanger body 14 relative to the interior of the vehicle 12. In addition, the upper button 28 includes a recess 32 therethrough for receiving a fastener 34, such as a screw, used with the disconnected hook.

Referring now to FIG. 4, the support 20 may include a hook 40 positioned on the back side of the button 26. The hook 40 projects outwardly from the support 20 when the support is in the upper position. This allows the hanger body 14 to be placed in the retracted or up position as best seen in FIG. 2, but with a hook 40 in position to receive a conventional clothes hanger, such as when transporting clothes from the cleaners.

The retractable garment hanger 10 of the present invention replaces the conventional garment hook in vehicles and may use the already existing screw 34. The garment hanger 10 is designed so that when in use, it will hang in a down position with a garment, such as a coat 15, but when not in use, can be easily stored away in an up position by merely snapping the projection 29 into the recess 30 thereby holding the hanger body 14 in an up position against the inside roof of the vehicle 12.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art and which are encompassed within the spirit of the invention and the scope of the appended claims.

What is claimed is:

1. A retractable garment hanger for attachment to the inside of a vehicle comprising,
    a hanger body having arms for holding clothes,
    a support connected to the body for supporting the body from the inside of a vehicle,
    said support including a hinge for moving the body to a down position for hanging clothes and to an up position for storing the body,
    said support including releasable fastening means for releasably holding the hanger body in an up position, said releasable fastening means includes coacting snap locking means on opposite sides of the hinge axis, and
    said coacting locking means includes first and second buttons, said first button including a projection and said second button including a recess for releasably securing the projection.
2. The hanger of claim 1 including,
    a swivel connection between the hanger body and the support for allowing rotational movement of the hanger relative to a vehicle.
3. The hanger of claim 1 wherein the buttons are rotatably secured to the support.
4. The hanger of claim 1 wherein the second button includes an aperture therethrough for receiving a fastener for attaching the hanger to the inside of a vehicle.
5. The hanger of claim 1 including the combination of a vehicle having a recess in the inside of the roof for receiving the hanger body when it is in the up position.
6. The hanger of claim 1 including:
    said support including a hook projecting outwardly from the support when the support is in an up position.

* * * * *